(12) United States Patent
Sasabayashi et al.

(10) Patent No.: US 11,335,509 B2
(45) Date of Patent: May 17, 2022

(54) MULTILAYER CERAMIC CAPACITOR

(71) Applicant: Murata Manufacturing Co., Ltd., Nagaokakyo (JP)

(72) Inventors: Takehisa Sasabayashi, Nagaokakyo (JP); Akitaka Doi, Nagaokakyo (JP); Kotaro Shimizu, Nagaokakyo (JP); Yoko Okabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 78 days.

(21) Appl. No.: 16/788,345

(22) Filed: Feb. 12, 2020

(65) Prior Publication Data

US 2020/0273623 A1    Aug. 27, 2020

(30) Foreign Application Priority Data

Feb. 22, 2019    (JP) .............................. JP2019-030129

(51) Int. Cl.
*H01G 4/30* (2006.01)
*H01G 4/02* (2006.01)
*H01G 4/12* (2006.01)
*H01G 4/012* (2006.01)

(52) U.S. Cl.
CPC .............. *H01G 4/30* (2013.01); *H01G 4/012* (2013.01); *H01G 4/02* (2013.01); *H01G 4/1209* (2013.01)

(58) Field of Classification Search
CPC ............ H01G 4/30; H01G 4/232; H01G 4/02; H01G 4/1209; H01G 4/228; H01G 4/012

USPC ............. 361/301.4, 321.1, 306.3, 321.3, 309
See application file for complete search history.

(56) References Cited

U.S. PATENT DOCUMENTS

| 2011/0141658 | A1* | 6/2011 | Na | H01G 4/30 361/321.2 |
| 2012/0007709 | A1* | 1/2012 | Taniguchi | H01F 17/0013 336/200 |
| 2016/0293331 | A1* | 10/2016 | Kitamura | H01G 4/12 |
| 2018/0162780 | A1* | 6/2018 | Kaneda | H01G 4/30 |

FOREIGN PATENT DOCUMENTS

| JP | 2005044903 A | * | 2/2005 |
| JP | 2012-182355 A | | 9/2012 |

* cited by examiner

*Primary Examiner* — Arun Ramaswamy
(74) *Attorney, Agent, or Firm* — Keating & Bennett, LLP (57) ABSTRACT

A multilayer ceramic capacitor includes a ceramic body including a stack of dielectric layers and internal electrodes, and an external electrode electrically connected to each of the internal electrodes and provided at each of both end surfaces of the ceramic body. The external electrode includes a metal layer and a plating layer on the metal layer. In a cross section of the metal layer that is obtained by cutting the external electrode along a plane parallel to a side surface at a central position in a width direction, the metal layer includes a dielectric material at an area ratio of about 20% or more, and includes cavities at an area ratio of about 5% or more and about 20% or less, the cavities having an average diameter of about 0.5 μm or more and about 1.5 μm or less, and having a maximum diameter of about 5.0 μm or less.

16 Claims, 7 Drawing Sheets

MULTILAYER CERAMIC CAPACITOR

CROSS REFERENCE TO RELATED APPLICATIONS

This application claims the benefit of priority to Japanese Patent Application No. 2019-030129 filed on Feb. 22, 2019. The entire contents of this application are hereby incorporated herein by reference.

BACKGROUND OF THE INVENTION

1. Field of the Invention

The present invention relates to a multilayer ceramic capacitor.

2. Description of the Related Art

A conventionally known multilayer ceramic capacitor includes a ceramic body including a stack of a plurality of dielectric layers and a plurality of internal electrodes, and an external electrode electrically connected to each of the internal electrodes and provided at each of both end surfaces of the ceramic body.

Japanese Patent Laying-Open No. 2012-182355 discloses a multilayer ceramic capacitor having the above-described structure. In the multilayer ceramic capacitor disclosed in Japanese Patent Laying-Open No. 2012-182355, the external electrode includes a metal layer containing metal and glass, and a plating layer covering the metal layer.

When a metal layer contains glass in the same manner as the multilayer ceramic capacitor disclosed in Japanese Patent Laying-Open No. 2012-182355, the glass contained in the metal layer may be eluted into a plating solution during formation of a plating layer of the external electrode. This is not preferable since the plating solution remains in cavities formed by elution of glass. For this reason, it is preferable that the metal layer of the external electrode does not contain glass. However, in the configuration in which the metal layer does not contain glass, cracks may occur in the fired external electrode due to the stress of thermal shrinkage of the metal layer occurring during firing in the process of manufacturing a multilayer ceramic capacitor.

SUMMARY OF THE INVENTION

Preferred embodiments of the present invention provide multilayer ceramic capacitors that each include an external electrode including a metal layer that does not include glass and still reduces or prevents the occurrence of cracks.

A multilayer ceramic capacitor according to a preferred embodiment of the present invention includes a ceramic body including a stack of a plurality of dielectric layers and a plurality of internal electrodes, the ceramic body including a first main surface and a second main surface that face each other in a stacking direction, a first side surface and a second side surface that face each other in a width direction orthogonal or substantially orthogonal to the stacking direction, and a first end surface and a second end surface that face each other in a length direction orthogonal or substantially orthogonal to the stacking direction and the width direction; and an external electrode electrically connected to each of the internal electrodes and provided at each of the first end surface and the second end surface of the ceramic body.

The external electrode includes a metal layer and a plating layer that is provided on the metal layer.

In a cross section of the metal layer that is obtained by cutting the external electrode along a plane parallel or substantially parallel to the first side surface and the second side surface at a central position in the width direction, the metal layer (a) includes a dielectric material at an area ratio of about 20% or more, and (b) includes a plurality of cavities at an area ratio of about 5% or more and about 20% or less, the cavities having an average diameter of about 0.5 μm or more and about 1.5 μm or less, and having a maximum diameter of about 5.0 μm or less.

The metal layer may include Ni.

Furthermore, the plating layer may include Cu.

A relationship of DT<DW<DL may be established, where DT denotes a dimension of the ceramic body in the stacking direction, DW denotes a dimension of the ceramic body in the width direction, and DL denotes a dimension of the ceramic body in the length direction.

The dimension DT of the ceramic body in the stacking direction may be about 0.05 mm or more and about 0.25 mm or less.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will hereinafter be specifically described with reference to the drawings.

First Preferred Embodiment

Figure 1:
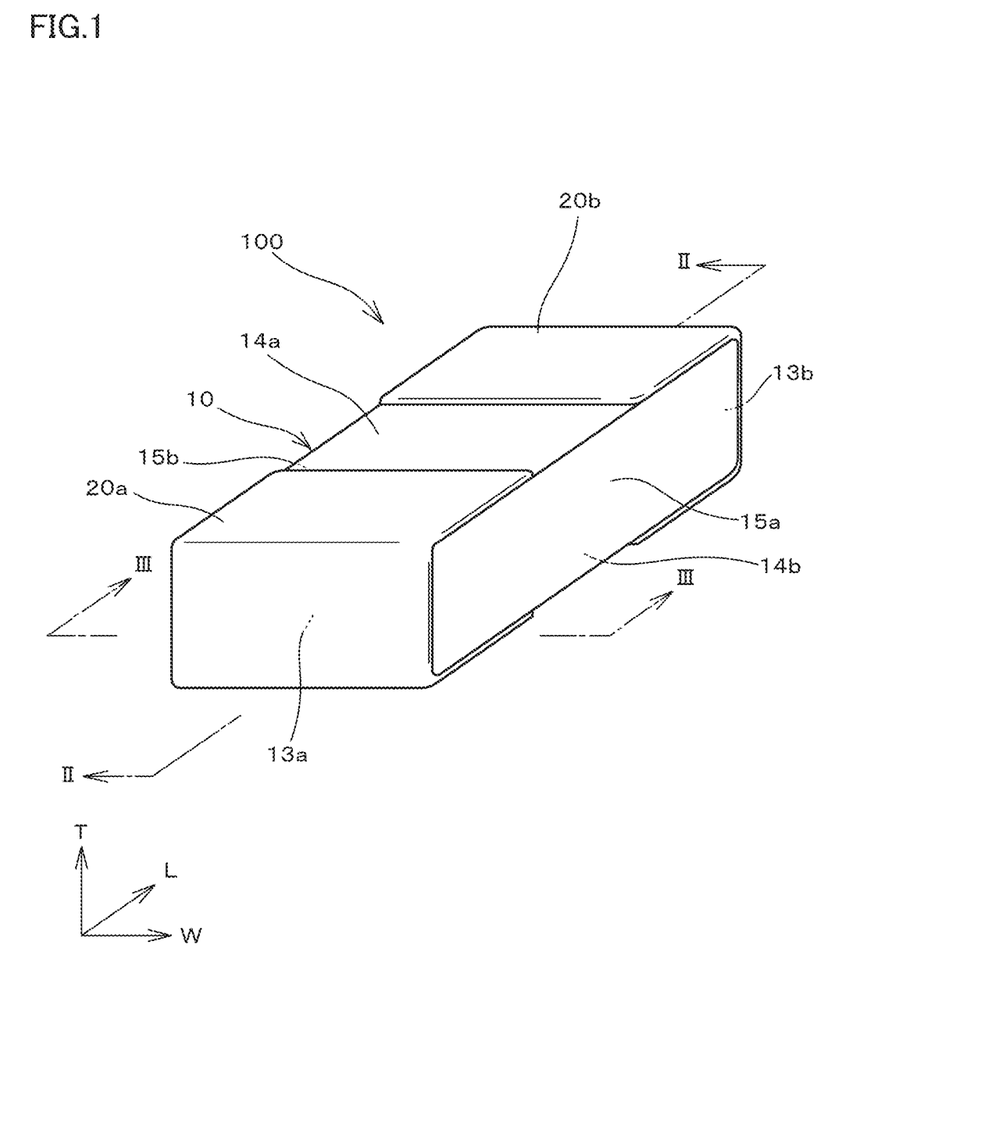
FIG. 1 is a perspective view of a multilayer ceramic capacitor according to a first preferred embodiment of the present invention.
Figure 2:
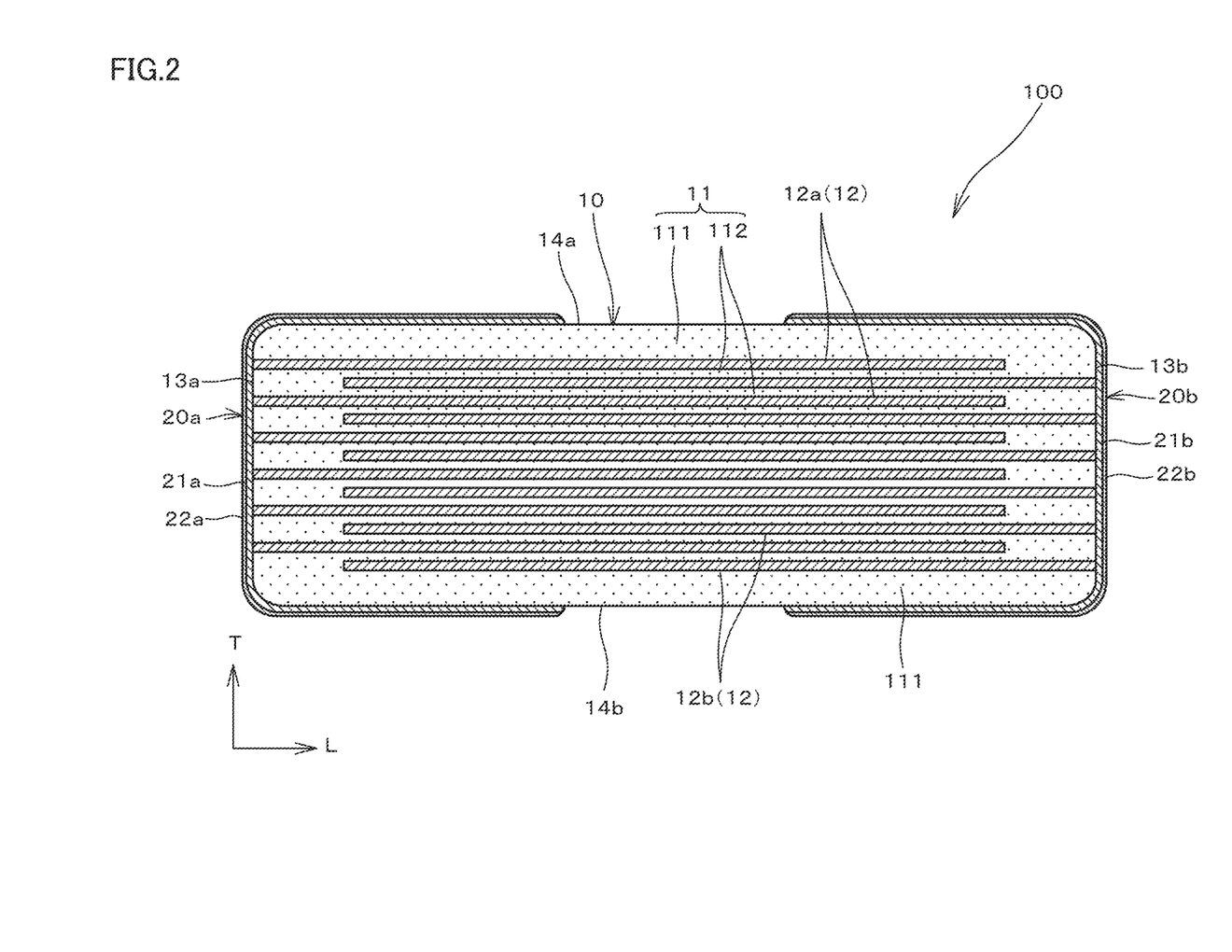
FIG. 2 is a cross-sectional view of the multilayer ceramic capacitor shown in FIG. 1 taken along a line II-II in FIG. 1.
Figure 3:
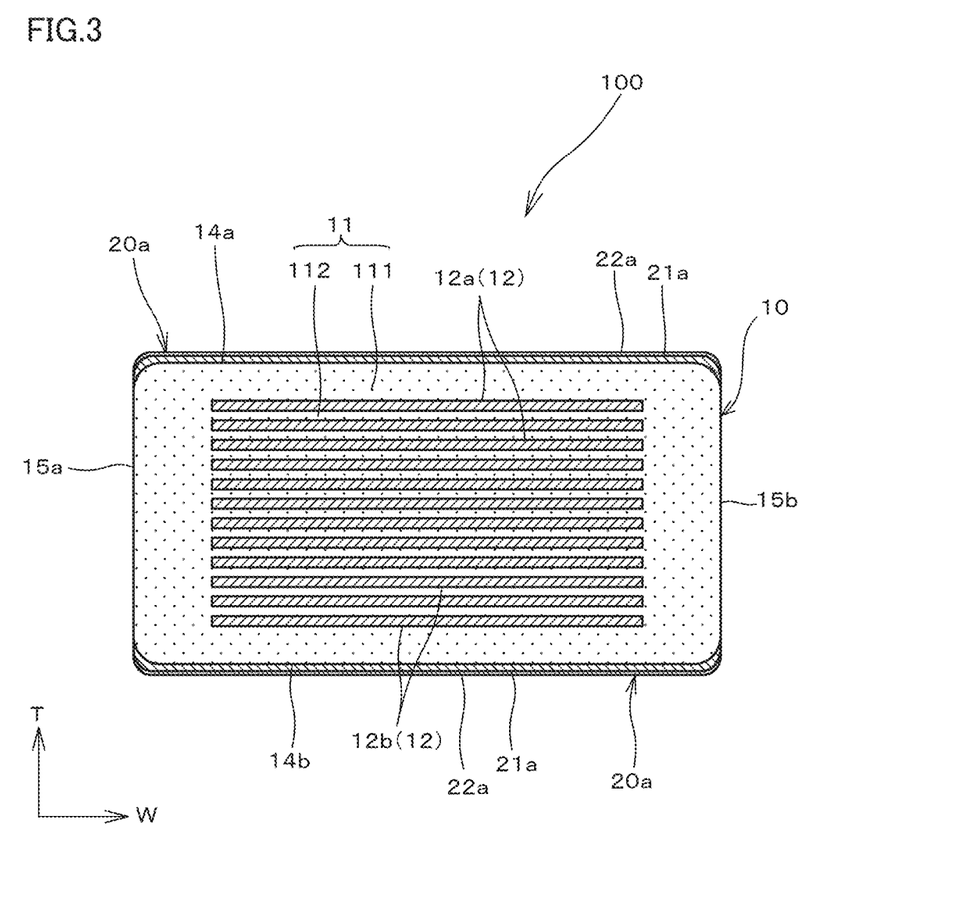
FIG. 3 is a cross-sectional view of the multilayer ceramic capacitor shown in FIG. 1 taken along a line III-III in FIG. 1.

FIG. 1 is a perspective view of a multilayer ceramic capacitor 100 according to a first preferred embodiment of the present invention. FIG. 2 is a cross-sectional view of multilayer ceramic capacitor 100 shown in FIG. 1 taken along a line II-II in FIG. 1. FIG. 3 is a cross-sectional view of multilayer ceramic capacitor 100 shown in FIG. 1 taken along a line in FIG. 1.

As shown in FIGS. 1 to 3, multilayer ceramic capacitor 100 is an electronic component having a rectangular or substantially rectangular parallelepiped shape and includes a ceramic body 10, a first external electrode 20a, and a second external electrode 20b.

Multilayer ceramic capacitor 100 preferably has, for example, a dimension of, for example, about 0.8 mm or more and about 1.1 mm or less in a length direction L, a dimension of about 0.4 mm or more and about 0.6 mm or less in a width direction W, and a dimension of about 0.08 mm or more and about 0.3 mm or less in a stacking direction T. These dimensions each have a tolerance of about 10%, for example.

Ceramic body 10 includes a first end surface 13a and a second end surface 13b that face each other in length direction L, a first main surface 14a and a second main surface 14b that face each other in stacking direction T, and a first side surface 15a and a second side surface 15b that face each other in width direction W.

The relationship of DT<DW<DL is preferably established, where DL denotes a dimension of ceramic body 10 in length direction L, DW denotes a dimension of ceramic body 10 in width direction W, and DT denotes a dimension of ceramic body 10 in stacking direction T. For example, preferably, ceramic body 10 has a dimension DL of about 0.4 mm or more and about 1.0 mm or less in length direction L, a dimension DW of about 0.3 mm or more and about 0.5 mm or less in width direction W, and dimension DT of about 0.05 mm or more and about 0.25 mm or less in stacking direction T. Dimension DT of ceramic body 10 in stacking direction T preferably establishes the relationship in the following equation (1), and is more preferably about 0.1 mm or less, for example. It should be noted that the above-described dimensions each have a tolerance of about 10%, for example.

$$(1/7) \times DW \leq DT \leq (1/3) \times DW \quad (1)$$

Ceramic body 10 includes a corner portion and a ridgeline portion, each of which is preferably rounded. In this case, the corner portion is a portion at which three planes of ceramic body 10 cross each other. The ridgeline portion is a portion at which two planes of ceramic body 10 cross each other.

As shown in FIGS. 2 and 3, ceramic body 10 includes a stack of a plurality of dielectric layers 11 and a plurality of internal electrodes 12. The plurality of internal electrodes 12 include a plurality of first internal electrodes 12a and a plurality of second internal electrodes 12b.

Dielectric layer 11 includes an outer dielectric layer 111 located on each of both outer surfaces of ceramic body 10 in stacking direction T, and an inner dielectric layer 112 located between first internal electrode 12 a and second internal electrode 12b.

Dielectric layer 11 is preferably made of, for example, a dielectric material including $BaTiO_3$, $CaTiO_3$, $SrTiO_3$, $CaZrO_3$ or the like as a main component. This main component may additionally include a sub-component, such as, for example, an Mn compound, an Fe compound, a Cr compound, a Co compound, and an Ni compound, that is less in content than the main component.

Outer dielectric layer 111 preferably has a thickness of about 10 μm or more and about 30 μm or less, for example. Inner dielectric layer 112 preferably has a thickness of about 0.4 μm or more and about 0.8 μm or less, for example. The number of stacked layers of dielectric layers 11 including outer dielectric layers 111 and inner dielectric layers 112 is preferably 10 or more and 200 or less, for example.

First internal electrode 12a extends to first end surface 13a of ceramic body 10. Second internal electrode 12b extends to second end surface 13b of ceramic body 10.

In addition to first internal electrode 12a and second internal electrode 12b, ceramic body 10 may include an internal electrode that is not exposed to the surface.

First internal electrode 12a includes a counter electrode portion that faces second internal electrode 12b, and an extraction electrode portion that extends from the counter electrode portion to first end surface 13a of ceramic body 10. Second internal electrode 12b includes a counter electrode portion that faces first internal electrode 12a, and an extraction electrode portion that extends from the counter electrode portion to second end surface 13b of ceramic body 10. The counter electrode portion of first internal electrode 12a and the counter electrode portion of second internal electrode 12b face each other with inner dielectric layer 112 interposed therebetween, thus producing a capacitance so as to define and function as a capacitor.

First internal electrode 12a and second internal electrode 12b each preferably include, for example, metals such as Cu, Ni, Ag, Pd, Ti, Cr, and Au, or an alloy including these metals as main components. First internal electrode 12a and second internal electrode 12b may include, as a co-material, dielectric particles having the same or substantially the same composition as that of ceramic contained in dielectric layer 11.

The number of stacked internal electrodes 12 including first internal electrodes 12a and second internal electrodes 12b is preferably 10 or more and 30 or less, for example. Internal electrode 12 preferably has a thickness of about 0.3 μm or more and about 0.8 μm or less, for example.

The metal of internal electrode 12 preferably diffuses through external electrodes 20a and 20b. The metal of internal electrode 12 thus diffuses through external electrodes 20a and 20b, so that the volume of metals of external electrodes 20a and 20b expands to fill in small gaps existing in these electrodes, thus improving the advantageous effect of reducing or preventing intrusion of moisture into the electrodes. The metal of internal electrode 12 diffuses preferably to a length of about 4 μm or more, for example, through external electrodes 20a and 20b.

In this case, the thickness of each of dielectric layer 11, first internal electrode 12a and second internal electrode 12b can be measured by the following method.

First, the surface of ceramic body 10 defined in stacking direction T and width direction W (that is, the surface of ceramic body 10 that is orthogonal or substantially orthogonal to length direction L) is polished to expose a cross section, which is then observed with a scanning electron microscope. Then, the thickness of dielectric layer 11 is measured along a total of five lines including a center line passing through the center or approximate center of the exposed cross section along stacking direction T, and two lines extending in parallel or substantially in parallel with the center line at regular intervals from this center line toward one side, and two lines extending in parallel or substantially in parallel with the center line at regular intervals from this center line toward the other side. The average value of five measured values is defined as a thickness of dielectric layer 11.

For more accuracy, the five measured values are obtained in each of an upper portion, a central portion, and a lower portion that are obtained by virtually dividing ceramic body 10 in stacking direction T. Then, all of these measured values are averaged to obtain an average value that is defined as a thickness of dielectric layer 11.

The method of measuring the thickness of dielectric layer 11 has been described above. Also, by conforming to this method of measuring the thickness of dielectric layer 11, the thickness of each of first internal electrode 12a and second internal electrode 12b can be measured using a scanning electron microscope (hereinafter also abbreviated as an "SEM") along the same cross section as that along which the thickness of dielectric layer 11 is measured.

First external electrode 20a extends entirely or substantially entirely over first end surface 13a of ceramic body 10 and extends from first end surface 13a partially over first main surface 14a and second main surface 14b. First external electrode 20a is electrically connected to first internal electrode 12a.

Second external electrode 20b extends entirely or substantially entirely over second end surface 13b of ceramic body 10 and extends from second end surface 13b partially over first main surface 14a and second main surface 14b. Second external electrode 20b is electrically connected to second internal electrode 12b.

First external electrode 20a includes a first metal layer 21a and a first plating layer 22a that is disposed on first metal layer 21a. Second external electrode 20b includes a second metal layer 21b and a second plating layer 22b that is disposed on second metal layer 21b.

Metal layers 21a and 21b each preferably include metal and a dielectric material, but do not include glass. The metal included in metal layers 21a and 21b is preferably Ni or Cu, for example. The number of each of metal layers 21a and 21b may be one or may be two or more. The thickest portion of each of metal layers 21a and 21b preferably has a thickness of about 1 µm or more and about 20 µm or less, for example.

In the present preferred embodiment, the dielectric material included in metal layers 21a and 21b is the same or substantially the same as the dielectric material of dielectric layer 11. However, the dielectric material included in metal layers 21a and 21b may not be completely the same as the dielectric material of dielectric layer 11.

In a cross section of each of metal layers 21a and 21b that is obtained by cutting respective external electrodes 20a and 20b along a plane parallel or substantially parallel to first side surface 15a and second side surface 15b at a central position in width direction W, metal layers 21a and 21b preferably each (a) include a dielectric material at an area ratio of about 20% or more, and (b) include a plurality of cavities at an area ratio of about 5% or more and about 20% or less, the cavities having an average diameter of about 0.5 µm or more and about 1.5 µm or less, and having a maximum diameter of about 5.0 µm or less, for example.

The area ratio in the above-described (a) and (b) means an area ratio in the cross section of each of metal layers 21a and 21b. The average diameter and the maximum diameter of the cavities each can be calculated by the following method.

First, the surface of multilayer ceramic capacitor 100 defined in stacking direction T and length direction L is polished to the central position in width direction W to thus expose a cross section. Then, the exposed cross section is observed and imaged with an SEM under a magnification of about 5000 times at an acceleration voltage of 15 kV in a field of view of 30 µm×30 µm. Then, the region where no composition is detected by a WDX analysis is considered as a cavity.

Then, the edge of the cavity is identified using image processing software to calculate the area of the cavity. Then, assuming that this calculated area is defined as an area of a circle, its diameter is calculated. The diameters of all of the cavities included in the imaged range are measured and averaged to obtain an average value that is defined as an average diameter. Also, the largest diameter is defined as a maximum diameter.

Furthermore, in the same cross section, a dielectric material portion is specified by a WDX analysis. Then, the ratio of the area occupied by the dielectric material portion in the cross section can be obtained as an area ratio of the dielectric material.

Figure 4:
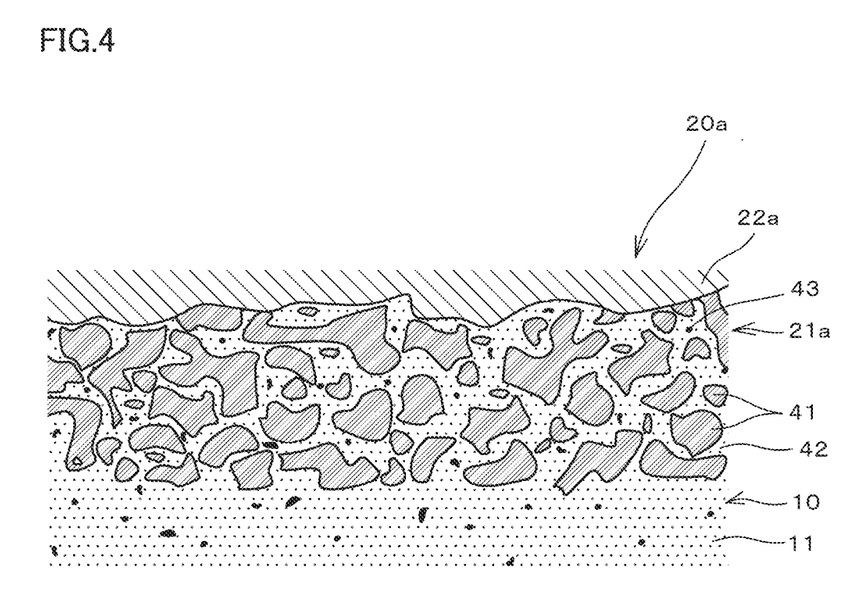
FIG. 4 is a diagram schematically showing a cross section of a first metal layer.

FIG. 4 is a diagram schematically showing a cross section of metal layer 21a. Although not shown, metal layer 21b is also configured in the same or substantially the same manner as metal layer 21a. As described above, metal layer 21a includes metal 41, a dielectric material 42, and a cavity 43.

The metal layers 21a and 21b are each formed as a result of a conductive paste including metal and a dielectric material being applied and baked onto a ceramic body. Baking is preferably performed simultaneously with firing of the ceramic body.

Plating layers 22a and 22b are each preferably made of Cu, for example. The number of each of plating layers 22a and 22b may be one or may be two or more. The thickness of each layer of plating layers 22a and 22b is preferably about 1 µm or more and about 10 µm or less, for example.

When each of plating layers 22a and 22b includes a plurality of layers, an outermost plating layer is preferably made of one metal selected from the group consisting of Cu, Au, Ag, and Al; or an alloy including the one metal. It is particularly preferable to use Cu, for example, as metal for an outermost plating layer for reasons described later.

Multilayer ceramic capacitor 100 in the present preferred embodiment can be used in the state where it is embedded in a substrate. In this case, multilayer ceramic capacitor 100 may be configured such that multilayer ceramic capacitor 100 is embedded in the substrate that is provided with a through hole, through which multilayer ceramic capacitor 100 is electrically connected to other electronic components mounted on the surface of the substrate. The through hole defines and functions as a connection conductor that electrically connects other electronic components disposed on the surface of the substrate to external electrodes 20a and 20b of multilayer ceramic capacitor 100. The through hole may be formed, for example, by plating the side surface of a hole formed by using a laser beam such as a $CO_2$ laser beam.

When the reflectance of external electrodes 20a and 20b with respect to the laser beam is relatively low during formation of a hole in the substrate using the laser beam, the laser beam may reach the inside of multilayer ceramic capacitor 100 and damage multilayer ceramic capacitor 100. Thus, the outermost plating layer of each of external electrodes 20a and 20b preferably includes metal having a high reflectance with respect to a laser beam, for example, Cu.

The surface of the outermost plating layer of each of external electrodes 20a and 20b may be oxidized. In this case, at least the ridgeline portions of external electrodes 20a and 20b are preferably oxidized. As the outermost plating layer is oxidized to form an oxide film, oxygen binding occurs between the oxide film and the resin of the substrate in the state where multilayer ceramic capacitor 100 is embedded in the substrate. Thus, the close adhesiveness between multilayer ceramic capacitor 100 and the substrate is improved. It is more preferable that external electrodes 20a and 20b are entirely or substantially entirely oxidized to improve the close adhesiveness.

In order to reduce the dimension of multilayer ceramic capacitor 100 in stacking direction T, external electrodes 20a and 20b, more specifically, metal layers 21a and 21b, may be partially embedded in ceramic body 10. For example, by pressing in stacking direction T, external electrodes 20a and 20b can be partially embedded into ceramic body 10.

Figure 5:
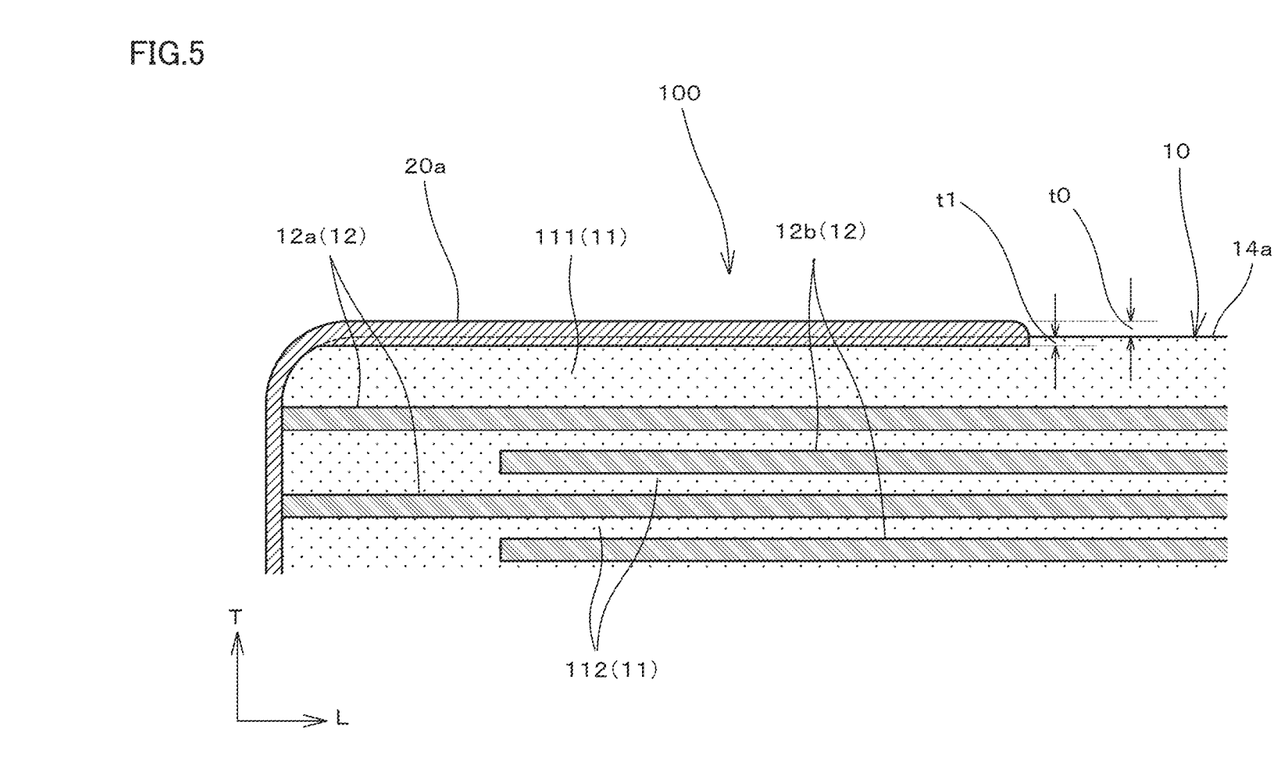
FIG. 5 is a partial enlarged cross-sectional view showing the state where a first external electrode is partially embedded in a ceramic body.

FIG. 5 is a partial enlarged cross-sectional view showing the state where first external electrode 20a is partially embedded in ceramic body 10. As shown in FIG. 4, on the first main surface 14a side of ceramic body 10, first external electrode 20a is partially embedded in ceramic body 10. In FIG. 5, a dotted line shows the outline of ceramic body 10 in the state where a portion of first external electrode 20a is not embedded in ceramic body 10.

In this case, assuming that the thickness of the portion of first external electrode 20a that is located on first main surface 14a of ceramic body 10 is defined as t0, and that the thickness of the portion of first external electrode 20a that is embedded in ceramic body 10 is defined as t1, the relationship in the following equation (2) is preferably established. It should be noted that thickness t0 and thickness t1 each are measured at a position in the central portion in width direction W.

$$(1/10) \times t0 \leq t1 \leq (2/5) \times t0 \quad (2)$$

Although not shown, second external electrode 20b can be configured in the same or substantially the same manner as described above.

When thickness t1 is less than $(1/10) \times t0$, the close adhesiveness between ceramic body 10 and each of external electrodes 20a and 20b decreases, so that external electrodes 20a and 20b may peel off, thus decreasing the reliability thereof. Furthermore, when thickness t1 is less than $(1/10) \times t0$, the portion of each of external electrodes 20a and 20b that is located on the surface of ceramic body 10 becomes thicker, so that it becomes difficult to sufficiently reduce the thickness of multilayer ceramic capacitor 100.

Furthermore, when thickness t1 is greater than $(2/5) \times t0$, the reliability of multilayer ceramic capacitor 100 may decrease. In other words, when external electrodes 20a and 20b are pressed to be embedded into ceramic body 10, high stress is applied to internal electrodes 12a and 12b to thus damage internal electrodes 12a and 12b. As a result, a desired capacitance may not be able to be achieved, or a short circuit may occur between internal electrodes 12a and 12b located adjacent to each other.

The amount of embedding external electrodes 20a and 20b into ceramic body 10 can be measured by the following method. First, the surface of multilayer ceramic capacitor 100 defined in length direction L and stacking direction T is polished to the central position of multilayer ceramic capacitor 100 in width direction W, to expose a cross section. Then, the thicknesses of external electrodes 20a and 20b exposed in the cross section are measured using an optical microscope or the like.

In this case, the edge of each of external electrodes 20a and 20b in length direction L on each of first main surface 14a and second main surface 14b of ceramic body 10 preferably has a straight line or substantially straight line shape and more preferably has a straight line shape.

Figure 6:
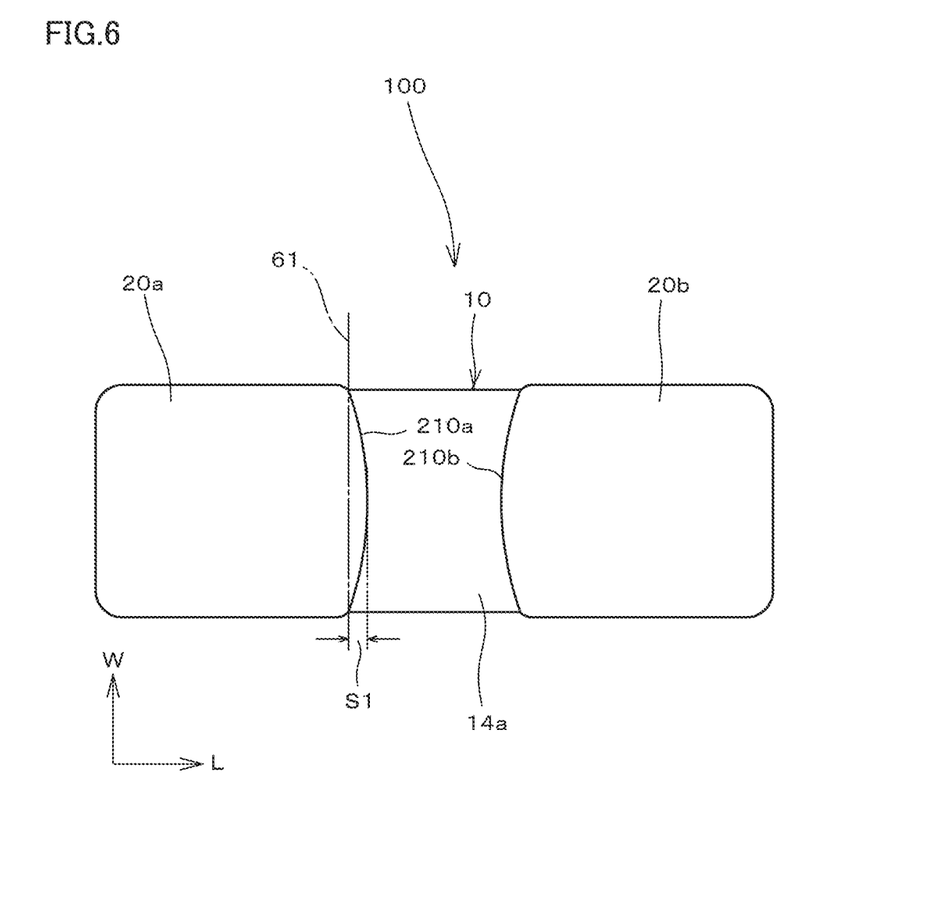
FIG. 6 is a top view showing the first main surface side of the multilayer ceramic capacitor.

FIG. 6 is a top view showing the first main surface 14a side of multilayer ceramic capacitor 100. In the following, the substantially straight line shape and the straight line shape will be described with reference to the shape of an edge 210a of first external electrode 20a shown in FIG. 6.

The shape of edge 210a of first external electrode 20a in length direction L is defined as a substantially straight line shape in the case where a distance S1 is about 30 μm or less. Distance S1 is defined between a line 61 connecting both ends in width direction W of edge 210a in length direction L in a portion of first external electrode 20a shown in FIG. 6 that is located on first main surface 14a, and the outermost position of edge 210a in length direction L. When the distance S1 is zero, the shape of edge 210a of first external electrode 20a in length direction L is defined as a straight line shape. The same also applies to second external electrode 20b.

FIG. 6 shows an example in which edge 210a of first external electrode 20a bulges in the direction toward second external electrode 20b while edge 210b of second external electrode 20b bulges in the direction toward first external electrode 20a. The same definition regarding the shape of each edge as described above is also applied to the case where each edge bulges in the direction opposite to length direction L.

In the state were the edges of external electrodes 20a and 20b each have a straight line shape or a substantially straight line shape, a positional misalignment between the through hole in the substrate and each of external electrodes 20a and 20b can be reduced or prevented when multilayer ceramic capacitor 100 embedded in the substrate is used. In particular, when the edges of external electrodes 20a and 20b bulge not toward each other on the same main surface but toward their own end surfaces, the positional misalignment between the through hole in the substrate and each of external electrodes 20a and 20b can be effectively reduced or prevented.

Method of Manufacturing Multilayer Ceramic Capacitor

A non-limiting example of a method of manufacturing a multilayer ceramic capacitor according a preferred embodiment of the present invention will be described below.

First, a ceramic green sheet, a conductive paste for internal electrodes, and a conductive paste for external electrodes are prepared. Each of the applicable ceramic green sheet and the applicable conductive paste for internal electrodes is known and includes an organic binder and an organic solvent.

Then, the conductive paste for internal electrodes is printed onto the ceramic green sheet to this form an internal electrode pattern. The conductive paste for internal electrodes can be printed by printing methods such as screen printing and gravure printing, for example.

Then, a prescribed number of ceramic green sheets each including no internal electrode pattern formed thereon are stacked, on which a ceramic green sheet including an internal electrode pattern formed thereon is sequentially stacked, on which a prescribed number of ceramic green sheets each including no internal electrode pattern formed thereon are stacked, thus producing a mother multilayer body.

Then, the mother multilayer body is pressed in the stacking direction by a method such as rigid body pressing, hydrostatic pressing, and the like, for example. By pressing, the internal electrode pattern is partially embedded into the ceramic green sheet located on the outside of the mother multilayer body.

The amount of embedding the internal electrode pattern can be adjusted to a desired value, for example, by adjusting the pressing amount, the pressing pressure, and the hardness and the elastic modulus of the press member that comes into contact with the mother multilayer body during pressing. For example, when the mother multilayer body is pressed in the state where an elastic body such as rubber is not interposed between the press member and the mother multilayer body, the embedding amount is increased. When the mother multilayer body is pressed in the state where an elastic body is interposed between the press member and the mother multilayer body, the embedding amount is reduced. Also, even when an elastic body is interposed, the embedding amount can be adjusted by adjusting the elastic modulus of the elastic body.

Then, the pressed mother multilayer body is cut into prescribed size pieces by a cutting method such as press cutting, dicing and laser, for example, to thus obtain a multilayer chip. Then, the corner portion and the ridgeline portion of the multilayer chip may be rounded by barrel polishing and the like, for example.

Then, the multilayer chip is preferably heated for a prescribed time period, for example, for about 120 minutes, at a temperature of about 80° C. or more and about 200° C. or less, to thus dissipate the binder, the solvent and the like included in the multilayer chip. Thus, the adhesive force between the ceramic body and the external electrode after completion can be improved.

Then, the conductive paste for external electrodes is applied onto both end surfaces and portions of both main surfaces of the multilayer chip. The conductive paste for external electrodes includes dielectric particles that form a dielectric material of a metal layer after firing. The conductive paste for external electrodes does not include glass.

Then, the multilayer chip is dried. The multilayer chip is dried, for example, by blowing hot air or room temperature air onto the multilayer chip, or by applying far-infrared rays to the multilayer chip.

Then, the multilayer chip is fired. The firing temperature is preferably 900° C. or more and 1300° C. or less, for example, depending on the used material such as a ceramic material and a conductive paste material. Thus, the ceramic body and a metal layer of the external electrode are formed.

Lastly, a plating layer is formed on the surface of the metal layer. Plating may preferably be Cu plating, for example. Plating may be performed by electrolytic plating or by non-electrolytic plating, for example. However, non-electrolytic plating requires a pretreatment by a catalyst and the like in order to improve the plating deposition rate. As a result, the plating process becomes complicated. Thus, electrolytic plating is preferable. In the case where a plurality of plating layers are formed, one or more plating layers are further formed.

Through the above-described process, a multilayer ceramic capacitor can be manufactured.

Second Preferred Embodiment

In multilayer ceramic capacitor 100 according to the first preferred embodiment, first external electrode 20a extends entirely or substantially entirely over first end surface 13a of ceramic body 10, and extends from first end surface 13a partially over first main surface 14a and second main surface 14b. Furthermore, second external electrode 20b extends entirely or substantially entirely over second end surface 13b of ceramic body 10, and extends from second end surface 13b partially over first main surface 14a and second main surface 14b.

In contrast, in a multilayer ceramic capacitor according to a second preferred embodiment of the present invention, first external electrode 20a and second external electrode 20b each extend also partially over first side surface 15a and second side surface 15b of ceramic body 10.

Figure 7:
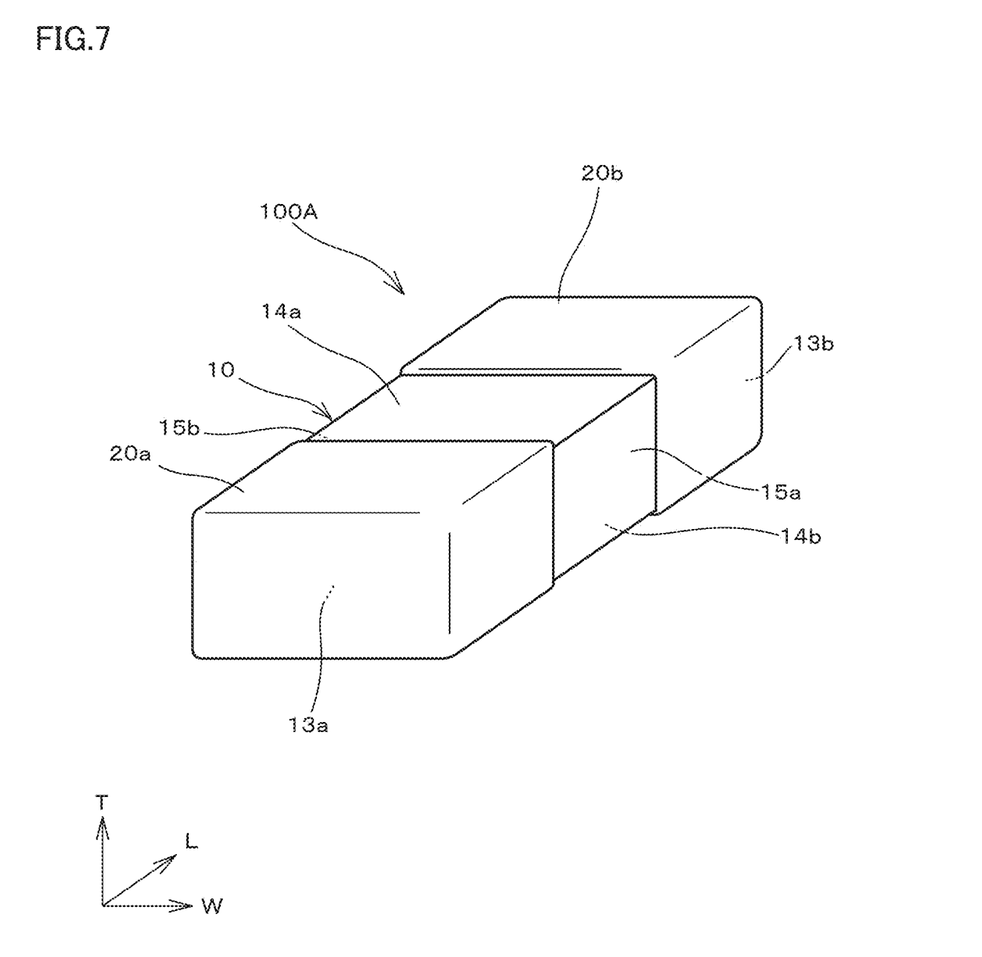
FIG. 7 is a perspective view of a multilayer ceramic capacitor according to a second preferred embodiment of the present invention.

FIG. 7 is a perspective view of a multilayer ceramic capacitor 100A according to the second preferred embodiment. First external electrode 20a extends entirely or substantially entirely over first end surface 13a of ceramic body 10, and extends from first end surface 13a partially over first main surface 14a, second main surface 14b, first side surface 15a, and second side surface 15b. Second external electrode 20b extends entirely or substantially entirely over second end surface 13b of ceramic body 10, and extends from second end surface 13b partially over first main surface 14a, second main surface 14b, first side surface 15a, and second side surface 15b.

High-Temperature Load Test

A high-temperature load test was conducted for seven types of multilayer ceramic capacitors including external electrodes having differently structured metal layers. In this case, fifty multilayer ceramic capacitors were prepared for each of seven types. In this case, the multilayer ceramic capacitors were determined as non-defective products on conditions of a temperature of about 125° C., a humidity of about 95%, a voltage of about 2V, and a leakage current of about 20 μA or less. On the conditions other than these, the multilayer ceramic capacitors were determined as defective products (NG). Also, it was determined by visual observation whether cracks occurred or not in the external electrode. The results are shown in Table 1.

TABLE 1

| SAMPLE NUMBER | AVERAGE PARTICLE SIZE OF CAVITIES (μm) | MAXIMUM PARTICLE SIZE OF CAVITIES (μm) | AREA RATIO OF CAVITIES (%) | NUMBER OF CRACKS | HIGH-LOAD TEST NUMBER OF NG |
|---|---|---|---|---|---|
| 1 | 0.50 | 1.34 | 5.2 | 0 | 0 |
| 2 | 0.72 | 1.88 | 9.7 | 0 | 0 |
| 3 | 1.03 | 2.37 | 12.5 | 0 | 0 |
| 4 | 1.39 | 3.86 | 17.3 | 0 | 0 |
| 5 | 1.50 | 4.97 | 19.8 | 0 | 0 |
| 6* | 0.13 | 0.27 | 4.3 | 3 | 0 |
| 7* | 1.98 | 6.01 | 24.2 | 0 | 12 |

The multilayer ceramic capacitors of sample numbers 1 to 5 are samples each satisfying the following requirements for preferred embodiments of the present invention. Specifically, "in a cross section of a metal layer that is obtained by cutting an external electrode along a plane parallel or substantially parallel to the first side surface and the second side surface at a central position in a width direction, the metal layer preferably (a) includes a dielectric material at an area ratio of about 20% or more, and (b) includes a plurality of cavities at an area ratio of about 5% or more and about 20% or less, the cavities having an average diameter of about 0.5 μm or more and about 1.5 μm or less, and having a maximum diameter of about 5.0 μm or less," for example.

On the other hand, the multilayer ceramic capacitors of sample numbers 6 and 7 each suffixed with a symbol "*" are samples not satisfying the above-described requirements for preferred embodiments of the present invention.

As shown in Table 1, the multilayer ceramic capacitors of sample numbers 1 to 5 satisfying the requirements for preferred embodiments of the present invention did not include cracks in their external electrodes, and were not determined as defective products in the high-temperature load test.

In contrast, among fifty multilayer ceramic capacitors of sample number 6 having a cavity area ratio of less than about 5% and not satisfying the requirements for preferred embodiments of the present invention, three multilayer ceramic capacitors included cracks in their external electrodes. Among fifty multilayer ceramic capacitors of sample number 7 having a cavity area ratio of greater than about 20% and not satisfying the requirements for preferred embodiments of the present invention, twelve multilayer ceramic capacitors were determined as defective as a result of the high-temperature load test.

Thus, the multilayer ceramic capacitors according to preferred embodiments of the present invention each include an external electrode including a metal layer that does not include glass, and still reduces or prevents the occurrence of cracks.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a ceramic body including a stack of a plurality of dielectric layers and a plurality of internal electrodes, the ceramic body including:
      a first main surface and a second main surface that face each other in a stacking direction;
      a first side surface and a second side surface that face each other in a width direction orthogonal or substantially orthogonal to the stacking direction; and
      a first end surface and a second end surface that face each other in a length direction orthogonal or substantially orthogonal to the stacking direction and the width direction; and
   an external electrode electrically connected to each of the plurality of internal electrodes and provided at each of the first end surface and the second end surface of the ceramic body; wherein
   the external electrode includes a metal layer and a plating layer on the metal layer;
   in a cross section of the metal layer that is obtained by cutting the external electrode along a plane parallel or substantially parallel to the first side surface and the second side surface at a central position in the width direction, the metal layer includes a dielectric material at an area ratio of about 20% or more, and includes a plurality of cavities at an area ratio of about 5% or more and about 20% or less, the cavities having an average diameter of about 0.5 µm or more and about 1.5 µm or less, and having a maximum diameter of about 5.0 µm or less.

2. The multilayer ceramic capacitor according to claim 1, wherein the metal layer includes Ni.

3. The multilayer ceramic capacitor according to claim 1, wherein the plating layer includes Cu.

4. The multilayer ceramic capacitor according to claim 1, wherein a relationship of DT<DW<DL is established, where DT denotes a dimension of the ceramic body in the stacking direction, DW denotes a dimension of the ceramic body in the width direction, and DL denotes a dimension of the ceramic body in the length direction.

5. The multilayer ceramic capacitor according to claim 4, wherein the dimension DT of the ceramic body in the stacking direction is about 0.05 mm or more and about 0.25 mm or less.

6. The multilayer ceramic capacitor according to claim 1, wherein the ceramic body includes corner portions and ridgeline portions that are rounded.

7. The multilayer ceramic capacitor according to claim 1, wherein each of the plurality of dielectric layers is made of at least one of $BaTiO_3$, $CaTiO_3$, $SrTiO_3$, or $CaZrO_3$ as a main component.

8. The multilayer ceramic capacitor according to claim 7, wherein each of the plurality of dielectric layers includes at least one of a Cr compound, a Co compound, or an Ni compound as a sub-component.

9. The multilayer ceramic capacitor according to claim 1, wherein the plurality of dielectric layers include inner dielectric layers and outer dielectric layers sandwiching the inner dielectric layer in the stacking direction.

10. The multilayer ceramic capacitor according to claim 9, wherein each of the outer dielectric layers has a thickness of about 10 µm or more and about 30 µm or less.

11. The multilayer ceramic capacitor according to claim 9, wherein each of the inner dielectric layers has a thickness of about 0.4 µm or more and about 0.8 µm or less.

12. The multilayer ceramic capacitor according to claim 9, wherein a number of dielectric layers included in the inner and outer dielectric layers is 10 or more and 200 or less.

13. The multilayer ceramic capacitor according to claim 1, wherein each of the plurality of internal electrodes includes at least one of Cu, Ni, Ag, Pd, Ti, Cr, or Au, or an alloy including at least one of Cu, Ni, Ag, Pd, Ti, Cr, or Au as main components.

14. The multilayer ceramic capacitor according to claim 1, wherein each of the plurality of internal electrodes has a thickness of about 0.3 µm µm or more and about 0.8 µm or less.

15. The multilayer ceramic capacitor according to claim 1, wherein a number of the plurality of internal electrodes is 10 or more and 30 or less.

16. The multilayer ceramic capacitor according to claim 1, wherein
   the metal layer does not include glass; and
   the external electrode is partially embedded into the ceramic body.

* * * * *